United States Patent
Chien

(10) Patent No.: US 10,514,479 B2
(45) Date of Patent: Dec. 24, 2019

(54) OPHTHALMIC LENS, INTRAOCULAR LENS, AND METHOD FOR MANUFACTURING OPHTHALMIC LENS

(71) Applicant: SCIENBIZIP CONSULTING (SHENZHEN) CO., LTD., Shenzhen (CN)

(72) Inventor: Hsiu-Wen Chien, New Taipei (TW)

(73) Assignee: ScienBiziP Consulting (Shenzhen) Co., Ltd., Shenzhen (CN)

( * ) Notice: Subject to any disclaimer, the term of this patent is extended or adjusted under 35 U.S.C. 154(b) by 115 days.

(21) Appl. No.: 15/486,416

(22) Filed: Apr. 13, 2017

(65) Prior Publication Data
US 2018/0243080 A1    Aug. 30, 2018

(30) Foreign Application Priority Data
Feb. 24, 2017 (TW) .............................. 106106275 A

(51) Int. Cl.
*G02B 1/04* (2006.01)
*C08F 230/08* (2006.01)
*G02C 7/10* (2006.01)

(52) U.S. Cl.
CPC ............ *G02B 1/041* (2013.01); *C08F 230/08* (2013.01); *G02C 7/108* (2013.01)

(58) Field of Classification Search
CPC ........ G02B 1/041; C08F 230/08; G02C 7/108
USPC ............................ 522/100, 103, 96; 523/106
See application file for complete search history.

(56) References Cited

U.S. PATENT DOCUMENTS

| | | | | |
|---|---|---|---|---|
| 4,252,421 A * | 2/1981 | Foley, Jr. | ......... | B29D 11/00317 351/159.24 |
| 4,857,072 A * | 8/1989 | Narducy | ................. | B41M 1/30 8/507 |
| 4,963,159 A * | 10/1990 | Narducy | ................. | B41M 1/30 8/507 |
| 5,018,849 A * | 5/1991 | Su | ........................ | G02C 7/021 351/159.24 |
| 5,089,180 A * | 2/1992 | Dunks | .................... | A61L 27/16 264/1.7 |
| 5,551,973 A * | 9/1996 | Oliver | .................... | C09D 11/34 106/31.25 |
| 7,216,975 B2 * | 5/2007 | Hong | ..................... | C09B 69/10 351/159.24 |
| 7,267,846 B2 * | 9/2007 | Doshi | ................. | C09D 11/101 427/466 |
| 7,276,189 B2 * | 10/2007 | Wires | .................... | B29C 31/041 264/1.1 |
| 9,360,594 B2 * | 6/2016 | Liu | ........................ | G02B 1/043 |
| 9,827,088 B2 * | 11/2017 | Risser | .................... | G02C 7/022 |

* cited by examiner

*Primary Examiner* — Sanza L. McClendon
(74) *Attorney, Agent, or Firm* — ScienBiziP, P.C.

(57) ABSTRACT

The present disclosure relates to manufacturing an intraocular lens which includes a matrix and a pigment dispersed in the matrix. A color of the intraocular lens can thus be red. An intraocular lens and a method for manufacturing the intraocular lens are also provided.

15 Claims, 1 Drawing Sheet

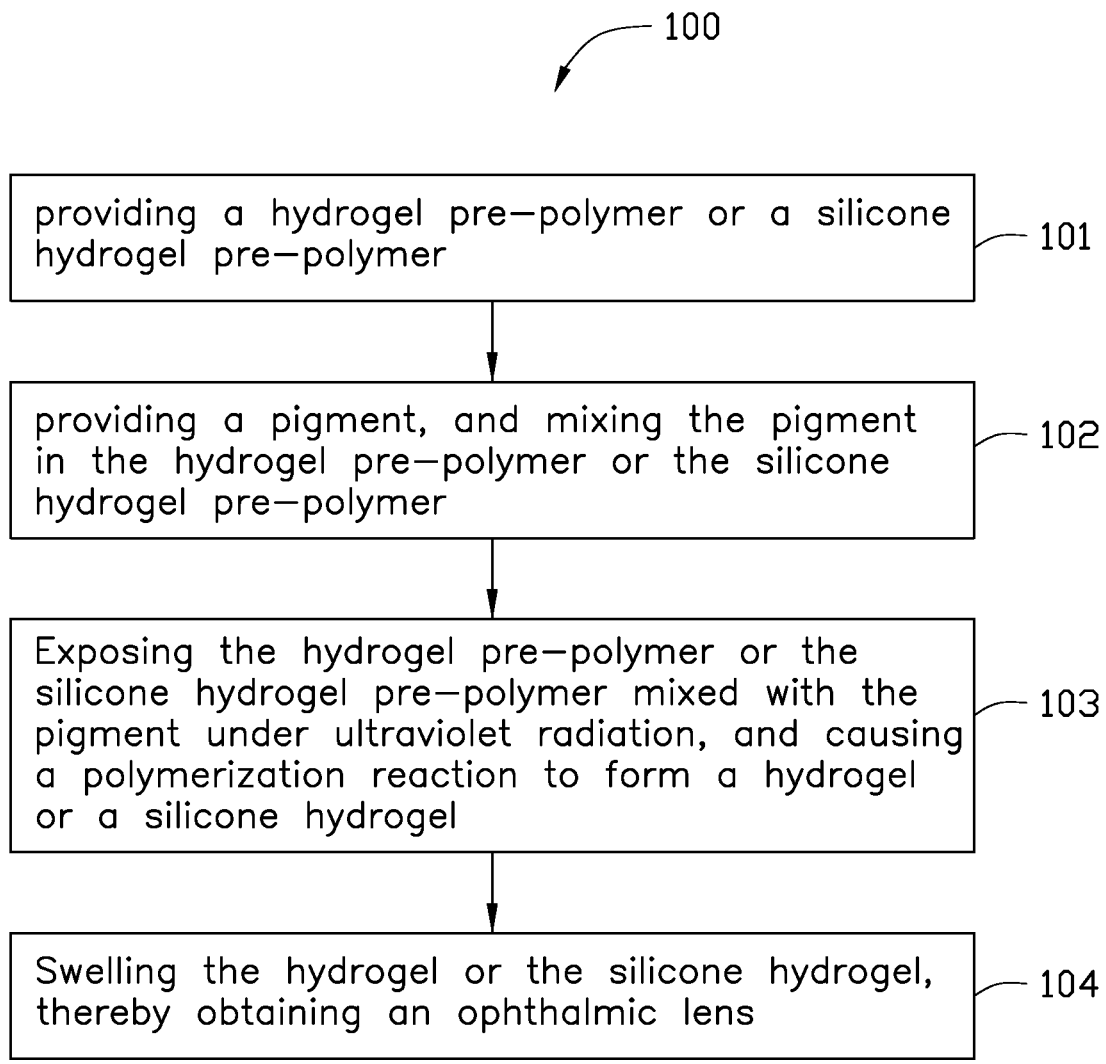

OPHTHALMIC LENS, INTRAOCULAR LENS, AND METHOD FOR MANUFACTURING OPHTHALMIC LENS

CROSS-REFERENCE TO RELATED APPLICATIONS

This application claims priority to Taiwanese Patent Application No. 106106275 filed on Feb. 24, 2017, the contents of which are incorporated by reference herein.

FIELD

The subject matter herein generally relates to ophthalmic lens.

BACKGROUND

Ophthalmic lens and intraocular lens are commonly worn by users to correct vision, or for cosmetic or therapeutic reasons. It has been known that ophthalmic lens in blue or green protects the eye by reducing strength of light.

BRIEF DESCRIPTION OF THE DRAWING

Implementations of the present technology will now be described, by way of example only, with reference to the attached FIGURE.

The FIGURE is a flowchart of an example embodiment for making an ophthalmic lens.

DETAILED DESCRIPTION

It will be appreciated that for simplicity and clarity of illustration, where appropriate, reference numerals have been repeated among the different FIGURES to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain sections have been exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series and the like.

The present disclosure is described in relation to an ophthalmic lens, including: a matrix, and a pigment dispersed in the matrix, wherein a color of the ophthalmic lens is red in the presence of the pigment.

The present disclosure is described in relation to an intraocular lens, including: a matrix, and a pigment dispersed in the matrix, wherein a color of the intraocular lens is red in the presence of the pigment.

The present disclosure is described in relation to a method for making an ophthalmic lens including: providing a hydrogel pre-polymer or a silicone hydrogel pre-polymer; providing a pigment, and mixing the pigment in the hydrogel pre-polymer or the silicone hydrogel pre-polymer; exposing the hydrogel pre-polymer or the silicone hydrogel pre-polymer mixed with the pigment under ultraviolet radiation, and causing a polymerization reaction to form a hydrogel or a silicone hydrogel; and swelling the hydrogel or the silicone hydrogel, thereby obtaining an ophthalmic lens.

According to a first embodiment, the present disclosure is described in relation to an ophthalmic lens, including a matrix and a pigment dispersed in the matrix. A color of the ophthalmic lens is red in the presence of the pigment.

A percentage of pigment in the ophthalmic is about 0.004% to about 5%.

In this embodiment, the pigment is selected from pigments certified safe by Food and Drug Administration of United States.

The color of the ophthalmic lens can be vermeil, dark red, reddish orange, rust red, pink, or other red color.

The pigment includes at least one red pigment.

In this embodiment, the red pigment can be C.I. Reactive Red 11, C.I. Reactive Red 180, or D&C Red No. 17.

In other embodiment, the pigment can further include at least one yellow pigment, and the yellow pigment can be C.I. Reactive yellow 15, C.I. Reactive yellow 86, or D&C yellow No. 10.

The ophthalmic lens can be a hydrogel lens or a silicone hydrogel lens.

In at least one embodiment, when the ophthalmic lens is a hydrogel lens, the matrix is hydrogel. When the ophthalmic lens is a silicone hydrogel lens, the matrix is silicone hydrogel.

In detail, when the matrix is hydrogel, the matrix is formed by an ultraviolet (UV) photopolymerization reaction of a hydrogel pre-polymer. The hydrogel pre-polymer includes at least one hydrophilic monomer, at least one photoinitiator, and at least one crosslinker. The pigmentcan be mixed into the hydrogel pre-polymer before the UV photopolymerization reaction. After the UV photopolymerization reaction, the pigment is dispersed into the gaps between molecules of the matrix.

The hydrophilic monomer includes, but is not limited to, at least one acrylic-based monomer (CR'H=CRCOX), where R is H or CH3, R' is H, CH3 or alkali, X is O, N, or one of the hydrophilic groups. Preferably, the acrylic-based monomer is 2-hydroxyethyl methacrylate (HEMA), N-, N-dimethylacrylamide acrylamide (DMA), methacrylic acid (MAA), N-Vinylpyrrolidone (NVP), polyethylene glycol methacrylate (PEGMA), sulfobetaine methacrylate (SBMA), or a combination thereof. The hydrophilic monomer has a mass percentage of about 75% to about 99.99% of the total mass of the hydrogel pre-polymer.

The crosslinker is ethylene glycol dimethacrylate (EGDMA), trimethylolpropane trimethacrylate (TMPTMA), N,N'-Methylenebisacrylamide (MBAA), or a combination thereof. The crosslinker has a mass percentage of about 0.5% to about 23% of the total mass of the hydrogel pre-polymer.

The photoinitiator is available commercially from Chemical Industries Basel (CIBA) Corporation as a clear liquid, under the trade name "Irgacure-1173". The photoinitiator has a mass percentage of about 0.01% to about 19% of the total mass of the hydrogel pre-polymer.

The hydrogel pre-polymer may further include a solvent such as water, ethanol, hexanol, or a combination thereof. The solvent has a mass percentage of about 0% to about 48% of the total mass of the hydrogel pre-polymer.

When the matrix is silicone hydrogel, the matrix is formed by an ultraviolet (UV) photopolymerization reaction of a silicone hydrogel pre-polymer. The silicone hydrogel pre-polymer includes at least one hydrophilic monomer, at least one silicone monomer, at least one photoinitiator, and at least one crosslinker. The pigmentcan be mixed into the silicone hydrogel pre-polymer before the UV photopolymerization reaction. After the UV photopolymerization reaction, the pigment is dispersed into the gaps between molecules of the matrix.

The hydrophilic monomer includes, but is not limited to, at least one acrylic-based monomer (CR'H=CRCOX), wherein R is H or CH3, R' is H, CH3 or alkali, X is O, N, or one of the hydrophilic groups. Preferably, the acrylic-based monomer is 2-hydroxyethyl methacrylate (HEMA), N-, N-dimethylacrylamide acrylamide (DMA), methacrylic acid (MAA), N-Vinylpyrrolidone (NVP), polyethylene glycol methacrylate (PEGMA), sulfobetaine methacrylate (SBMA), or a combination thereof.

The silicone monomer includes, but is not limited to, silicone-containing (—Si—O—Si—) monomer, macromere, or a mixture thereof. Preferably, the silicone monomer includes 3-[(trimethylsiloxy) silyl] propyl methacrylate (TRIS), 3-(trimethoxysilyl)propyl methacrylate (MSMA), Polydimethylsiloxane (PDMS), or a combination thereof.

The hydrophilic monomer and the silicone monomer have a combined mass percentage of about 55% to about 99.95% of the total mass of the silicone hydrogel pre-polymer.

The crosslinker is ethylene glycol dimethacrylate (EGDMA), trimethylolpropane trimethacrylate (TMPTMA), N,N'-Methylenebisacrylamide (MBAA), or a combination thereof. The crosslinker has a mass percentage of about 0.1% to about 34% of the total mass of the silicone hydrogel pre-polymer.

The photoinitiator may be Irgacure 1173. The photoinitiator has a mass percentage of about 0.03% to about 18% of the total mass of the silicone hydrogel pre-polymer.

The silicone hydrogel pre-polymer may further include a solvent such as water, ethanol, hexanol, or a combination thereof. The solvent has a mass percentage of about 1.5% to about 52.5% of the total mass of the silicone hydrogel pre-polymer.

According to a second embodiment, the present disclosure is described in relation to an intraocular lens, including a matrix and a pigment dispersed in the matrix. A color of the intraocular lens is red in the presence of the pigment.

A percentage of pigment in the intraocular is about 0.004% to about 5%.

In this embodiment, the pigment is selected from pigments certified safe by Food and Drug Administration of United States.

The color of the intraocular lens can be vermeil, dark red, reddish orange, rust red, pink, or other red color.

The pigment includes at least one red pigment.

In this embodiment, the red pigment can be C.I. Reactive Red 11, C.I. Reactive Red 180, or D&C Red No. 17.

In other embodiments, the pigment can further includes a yellow pigment, and the yellow pigment can be C.I. Reactive yellow 15, C.I. Reactive yellow 86, or D&C yellow No. 10.

The intraocular lens can be a hydrogel lens or a silicone hydrogel lens.

In at least one embodiment, when the intraocular lens is a hydrogel lens, the matrix is hydrogel. When the intraocular lens is a silicone hydrogel lens, the matrix is silicone hydrogel.

In detail, when the matrix is hydrogel, the matrix is formed by an ultraviolet (UV) photopolymerization reaction of a hydrogel pre-polymer. The hydrogel pre-polymer includes at least one hydrophilic monomer, at least one photoinitiator, and at least one crosslinker. The pigmentcan be mixed into the hydrogel pre-polymer before the UV photopolymerization reaction. After the UV photopolymerization reaction, the pigment forms in the gaps between molecules of the matrix.

The hydrophilic monomer includes, but is not limited to, at least one acrylic-based monomer (CR'H=CRCOX), where R is H or CH3, R' is H, CH3 or alkali, X is O, N, or one of the hydrophilic groups. Preferably, the hydrophilic monomer is 2-hydroxyethyl methacrylate (HEMA), N-, N-dimethylacrylamide acrylamide (DMA), methacrylic acid (MAA), N-Vinylpyrrolidone (NVP), polyethylene glycol methacrylate (PEGMA), sulfobetaine methacrylate (SBMA), or a combination thereof. The hydrophilic monomer has a mass percentage of about 75% to about 99.99% of the total mass of the hydrogel pre-polymer.

The crosslinker is ethylene glycol dimethacrylate (EGDMA), trimethylolpropane trimethacrylate (TMPTMA), N,N'-Methylenebisacrylamide (MBAA), or a combination thereof. The crosslinker has a mass percentage of about 0.5% to about 23% of the total mass of the hydrogel pre-polymer.

The photoinitiator is available commercially from Chemical Industries Basel (CIBA) Corporation as a clear liquid, under the trade name "Irgacure-1173". The photoinitiator has a mass percentage of about 0.01% to about 19% of the total mass of the hydrogel pre-polymer.

The hydrogel pre-polymer may further include a solvent such as water, ethanol, hexanol, or a combination thereof. The solvent has a mass percentage of about 0% to about 48% of the total mass of the hydrogel pre-polymer.

When the matrix is silicone hydrogel, the matrix is formed by an ultraviolet (UV) photopolymerization reaction of a silicone hydrogel pre-polymer. The silicone hydrogel pre-polymer includes at least one hydrophilic monomer, at least one silicone monomer, at least one photoinitiator, and at least one crosslinker. The pigmentcan be mixed into the silicone hydrogel pre-polymer before the UV photopolymerization reaction. After the UV photopolymerization reaction, the pigment forms in the gaps between molecules of the matrix.

The hydrophilic monomer includes, but is not limited to, at least one acrylic-based monomer (CR'H=CRCOX), wherein R is H or CH3, R' is H, CH3 or alkali, X is O, N, or one of the hydrophilic groups. Preferably, the hydrophilic monomer is 2-hydroxyethyl methacrylate (HEMA), N-, N-dimethylacrylamide acrylamide (DMA), methacrylic acid (MAA), N-Vinylpyrrolidone (NVP), polyethylene glycol methacrylate (PEGMA), sulfobetaine methacrylate (SBMA), or a combination thereof.

The silicone monomer includes, but is not limited to, silicone-containing (—Si—O—Si—) monomer, macromere, or a mixture thereof. Preferably, the silicone monomer includes 3-[(trimethylsiloxy) silyl] propyl methacrylate (TRIS), 3-(trimethoxysilyl)propyl methacrylate (MSMA), Polydimethylsiloxane (PDMS), or a combination thereof.

The hydrophilic monomer and the silicone monomer have a combined mass percentage of about 55% to about 99.95% of the total mass of the silicone hydrogel pre-polymer.

The crosslinker is ethylene glycol dimethacrylate (EGDMA), trimethylolpropane trimethacrylate (TMPTMA), N,N'-Methylenebisacrylamide (MBAA), or a combination thereof. The crosslinker has a mass percentage of about 0.1% to about 34% of the total mass of the silicone hydrogel pre-polymer.

The photoinitiator may be Irgacure 1173. The photoinitiator has a mass percentage of about 0.03% to about 18% of the total mass of the silicone hydrogel pre-polymer.

The silicone hydrogel pre-polymer may further include a solvent such as water, ethanol, hexanol, or a combination thereof. The solvent has a mass percentage of about 1.5% to about 52.5% of the total mass of the silicone hydrogel pre-polymer.

The FIGURE illustrates a flowchart of a method for making an ophthalmic lens in accordance with an exemplary embodiment. The exemplary method is provided by way of example, as there are a variety of ways to carry out the method. Each block shown in the FIGURE represents one or more processes, methods, or subroutines, carried out in the exemplary method. Furthermore, the illustrated order of blocks is by example only and the order of the blocks can change. Additional blocks may be added or fewer blocks may be utilized, without departing from this disclosure. The exemplary method can begin at block 101.

At block 101, a hydrogel pre-polymer or a silicone hydrogel pre-polymer is provided.

In at least one embodiment, when the ophthalmic lens is a hydrogel lens, a hydrogel pre-polymer is provided. When the ophthalmic lens is a silicone hydrogel lens, a silicone hydrogel pre-polymer is provided.

The hydrogel pre-polymer includes at least one hydrophilic monomer, at least one photoinitiator, and at least one crosslinker. The pigmentcan be mixed into the hydrogel pre-polymer before the UV photopolymerization reaction. After the UV photopolymerization reaction, the pigment forms in the gaps between molecules of the matrix.

The hydrophilic monomer includes, but is not limited to, at least one acrylic-based monomer (CR'H=CRCOX), where R is H or CH3, R' is H, CH3 or alkali, X is O, N, or one of the hydrophilic groups. Preferably, the hydrophilic monomer is 2-hydroxyethyl methacrylate (HEMA), N-,N-dimethylacrylamide acrylamide (DMA), methacrylic acid (MAA), N-Vinylpyrrolidone (NVP), polyethylene glycol methacrylate (PEGMA), sulfobetaine methacrylate (SBMA), or a combination thereof. The hydrophilic monomer has a mass percentage of about 75% to about 99.99% of the total mass of the hydrogel pre-polymer.

The crosslinker is ethylene glycol dimethacrylate (EGDMA), trimethylolpropane trimethacrylate (TMPTMA), N,N'-Methylenebisacrylamide (MBAA), or a combination thereof. The crosslinker has a mass percentage of about 0.5% to about 23% of the total mass of the hydrogel pre-polymer.

The photoinitiator is available commercially from Chemical Industries Basel (CIBA) Corporation as a clear liquid, under the trade name "Irgacure-1173". The photoinitiator has a mass percentage of about 0.01% to about 19% of the total mass of the hydrogel pre-polymer.

The hydrogel pre-polymer may further include a solvent such as water, ethanol, hexanol or a combination thereof. The solvent has a mass percentage of about 0% to about 48% of the total mass of the hydrogel pre-polymer.

The silicone hydrogel pre-polymer includes at least one hydrophilic monomer, at least one silicone monomer, at least one photoinitiator, and at least one crosslinker. The pigment can be mixed into the silicone hydrogel pre-polymer before the UV photopolymerization reaction. After the UV photopolymerization reaction, the pigment forms in the gaps between molecules of the matrix.

The hydrophilic monomer includes, but is not limited to, at least one acrylic-based monomer (CR'H=CRCOX), wherein R is H or CH3, R' is H, CH3 or alkali, X is O, N, or one of the hydrophilic groups. Preferably, the hydrophilic monomer is 2-hydroxyethyl methacrylate (HEMA), N-,N-dimethylacrylamide acrylamide (DMA), methacrylic acid (MAA), N-Vinylpyrrolidone (NVP), polyethylene glycol methacrylate (PEGMA), sulfobetaine methacrylate (SBMA), or a combination thereof.

The silicone monomer includes, but is not limited to, silicone-containing (—Si—O—Si—) monomer, macromere, or a mixture thereof. Preferably, the silicone monomer includes 3-[(trimethylsiloxy) silyl] propyl methacrylate (TRIS), 3-(trimethoxysilyl)propyl methacrylate (MSMA), Polydimethylsiloxane (PDMS), or a combination thereof.

The hydrophilic monomer and the silicone monomer have a combined mass percentage of about 55% to about 99.95% of the total mass of the silicone hydrogel pre-polymer.

The crosslinker is ethylene glycol dimethacrylate (EGDMA), trimethylolpropane trimethacrylate (TMPTMA), N,N'-Methylenebisacrylamide (MBAA), or a combination thereof. The crosslinker has a mass percentage of about 0.1% to about 34% of the total mass of the silicone hydrogel pre-polymer.

The photoinitiator may be Irgacure 1173. The photoinitiator has a mass percentage of about 0.03% to about 18% of the total mass of the silicone hydrogel pre-polymer.

The silicone hydrogel pre-polymer may further include a solvent such as water, ethanol, hexanol, or a combination thereof. The solvent has a mass percentage of about 1.5% to about 52.5% of the total mass of the silicone hydrogel pre-polymer.

At block 102, a pigment is mixed into the hydrogel pre-polymer or the silicone hydrogel pre-polymer.

In this embodiment, the pigment is selected from pigments certified safe by Food and Drug Administration of United States.

A color of the hydrogel pre-polymer or a color of the silicone hydrogel pre-polymer can be vermeil, dark red, reddish orange, rust red, pink or other red color, after mixing the pigment.

The pigment includes at least one red pigment.

In this embodiment, the red pigment can be C.I. Reactive Red 11, C.I. Reactive Red 180, or D&C Red No. 17.

In other embodiment, the pigment can further include a yellow pigment, and the yellow pigment can be C.I. Reactive yellow 15, C.I. Reactive yellow 86, or D&C yellow No. 10.

At block 103, the hydrogel pre-polymer or the silicone hydrogel pre-polymer mixed with the pigment is placed into a mold and is exposed to ultraviolet radiation, to cause the hydrogel pre-polymer or the silicone hydrogel pre-polymer to undergo a polymerization reaction to form a hydrogel or a silicone hydrogel.

A time period for the polymerization reaction is from about 10 min to about 30 min.

At block 104, the hydrogel or the silicone hydrogel is immersed into ethanol solution with a percentage of about 50% and then inmmersed into deionized (DI) water for swelling, to obtain an ophthalmic lens.

EXAMPLE 1

A method for manufacturing an ophthalmic lens includes providing and mixing HEMA, NVP, TRIS, 11173, MSMA, EGDMA, ethanol and C.I. Reactive Red 11, to obtain a mixture. The mixture is cross-linked and cured by a UV-light curing process (ultraviolet light at a wavelength of about 365 nanometers) in a time period about 10 min, to form a silicone hydrogel. The ophthalmic lens is obtained by swelling the silicone hydrogel.

The HEMA has a mass percentage of 9.9% of the total mass of the mixture. The NVP has a mass percentage of 23% of the total mass of the mixture. The TRIS has a mass percentage of 30% of the total mass of the mixture. The Irgacure 1173 has a mass percentage of 0.66% of the total mass of the mixture. The MSMA has a mass percentage of 2.6% of the total mass of the mixture. The EGDMA has a mass percentage of 0.66% of the total mass of the mixture. The C.I. Reactive Red 11 has a mass percentage of 0.03% of the total mass of the mixture. The ethanol has a mass percentage of 33% of the total mass of the mixture.

EXAMPLE 2

A method for manufacturing an ophthalmic lens includes providing and mixing HEMA, NVP, MAA, 11173, EGDMA, ethanol, C.I. Reactive Red 11 and C.I. Reactive yellow 15, to obtain a mixture. The mixture is cross-linked and cured by a UV-light curing process (ultraviolet light at a wavelength of about 365 nanometers) in a time period about 10 min, to form a hydrogel. The ophthalmic lens is obtained by swelling the hydrogel.

The HEMA has a mass percentage of 63.07% of the total mass of the mixture. The NVP has a mass percentage of 10.77% of the total mass of the mixture. The MAA has a mass percentage of 2.5% of the total mass of the mixture. The Irgacure 1173 has a mass percentage of 0.03% of the total mass of the mixture. The EGDMA has a mass percentage of 0.23% of the total mass of the mixture. The C.I. Reactive Red 11 and C.I. Reactive yellow 15 have a combined mass percentage of 0.32% of the total mass of the mixture. The ethanol has a mass percentage of 23.08% of the total mass of the mixture.

EXAMPLE 3

An ophthalmic lens manufactured by the method in example 1. The ophthalmic lens includes a matrix and a pigment dispersed in the matrix. A color of the ophthalmic lens is red in the presence of the pigment. The pigment includes C.I. Reactive Red 11. A percentage of pigment in the ophthalmic is about 0.019%.

EXAMPLE 4

An ophthalmic lens manufactured by the method in example 2. The ophthalmic lens includes a matrix and a pigment dispersed in the matrix. A color of the ophthalmic lens is red in the presence of the pigment. The pigment includes C.I. Reactive Red 11 and C.I. Reactive yellow 15. A percentage of pigment in the ophthalmic is about 0.28%.

The exemplary embodiments shown and described above are only examples. Many details are often found in the art such as the other features of an ophthalmic lens. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the sections within the principles of the present disclosure, up to and including the full extent established by the broad general meaning of the terms used in the claims. It will therefore be appreciated that the exemplary embodiments described above may be modified within the scope of the claims.

What is claimed is:

1. An ophthalmic lens, comprising:
   a matrix; and
   a pigment dispersed in the matrix;
   wherein a color of the ophthalmic lens is red in the presence of the pigment; the pigment includes at least one red pigment and at least one yellow pigment, one of the at least one red pigment is C.I. Reactive Red 11, C.I. Reactive Red 180, or D&C Red No. 17.

2. The ophthalmic lens of claim 1, wherein the pigment has a mass percentage of about 0.004% to about 5% of a total mass of the ophthalmic lens.

3. The ophthalmic lens of claim 1, wherein one of the at least one the yellow pigment is C.I. Reactive yellow 15, C.I. Reactive yellow 86, or D&C yellow No. 10.

4. The ophthalmic lens of claim 1, wherein the matrix is hydrogel, the hydrogel matrix is formed by an ultraviolet photopolymerization reaction of a hydrogel pre-polymer, the hydrogel pre-polymer comprising at least one hydrophilic monomer, at least one photoinitiator and at least one crosslinker.

5. The ophthalmic lens of claim 4, wherein the hydrophilic monomer comprises at least one acrylic-based monomer; the acrylic-based monomer comprises 2-hydroxyethyl methacrylate, N-, N-dimethylacrylamide acrylamide, methacrylic acid, N-Vinylpyrrolidone, polyethylene glycol methacrylate, sulfobetaine methacrylate, or a combination thereof.

6. The ophthalmic lens of claim 4, wherein the hydrophilic monomer has a mass percentage of about 75% to about 99.99% of the total mass of the hydrogel pre-polymer.

7. The ophthalmic lens of claim 4, wherein the crosslinker comprises ethylene glycol dimethacrylate, trimethylolpropane trimethacrylate, N,N'-Methylenebisacrylamide, or a combination thereof; the crosslinker has a mass percentage of about 0.5% to about23% of the total mass of the hydrogel pre-polymer.

8. The ophthalmic lens of claim 1, wherein the matrix is silicone hydrogel, the silicone hydrogel matrix is formed by an ultraviolet photopolymerization reaction of a silicone hydrogel pre-polymer, the silicone hydrogel pre-polymer comprising at least one hydrophilic monomer, at least one silicone monomer, at least one photoinitiator and at least one crosslinker.

9. The ophthalmic lens of claim 8, wherein the hydrophilic monomer and the silicone monomer have a combined mass percentage of about 55% to about 99.95% of the total mass of the silicone hydrogel pre-polymer.

10. The ophthalmic lens of claim 8, wherein the hydrophilic monomer comprises at least one acrylic-based monomer; the acrylic-based monomer comprises 2-hydroxyethyl methacrylate, N-, N-dimethylacrylamide acrylamide, methacrylic acid, N-Vinylpyrrolidone, polyethylene glycol methacrylate, sulfobetaine methacrylate, or a combination thereof; the silicone monomer comprises 3-[(trimethylsiloxy) silyl] propyl methacrylate, 3-(trimethoxysilyl)propyl methacrylate, Polydimethylsiloxane or a mixture thereof.

11. The ophthalmic lens of claim 8, wherein the crosslinker comprises ethylene glycol dimethacrylate, trimethylolpropane trimethacrylate, N,N'-Methylenebisacrylamide, or a combination thereof; the crosslinker has a mass percentage of about 0.1% to about 34% of the total mass of the silicone hydrogel pre-polymer.

12. An intraocular lens, comprising:
a matrix; and
a pigment dispersed in the matrix;
wherein a color of the intraocular lens is red in the presence of the pigment; the pigment includes at least one red pigment and at least one yellow pigment, one of the at least one red pigment is C.I. Reactive Red 11, C.I. Reactive Red 180, or D&C Red No. 17.

13. The intraocular lens of claim 12, wherein the pigment has a mass percentage of about 0.004% to about 5% of a total mass of the intraocular lens.

14. A method for making an ophthalmic lens comprising:
providing a hydrogel pre-polymer or a silicone hydrogel pre-polymer;
providing a pigment, and mixing the pigment in the hydrogel pre-polymer or the silicone hydrogel pre-polymer;
exposing the hydrogel pre-polymer or the silicone hydrogel pre-polymer mixed with the pigment under ultraviolet radiation, and causing a polymerization reaction to form a hydrogel or a silicone hydrogel; a time period for the polymerization reaction being from about 10 min to about 30 min; and
swelling the hydrogel or the silicone hydrogel, thereby obtaining an ophthalmic lens; wherein the hydrogel or the silicone hydrogel is immersed into ethanol solution with a percentage of about 50% and then immersed into deionized (DI) water for swelling.

15. The method of claim 14, wherein the pigment has a mass percentage of about 0.004% to about 5% of a total mass of the ophthalmic lens.

* * * * *